(Model.)
E. F. SMITH.
MILK COOLER.
No. 252,534. Patented Jan. 17, 1882.
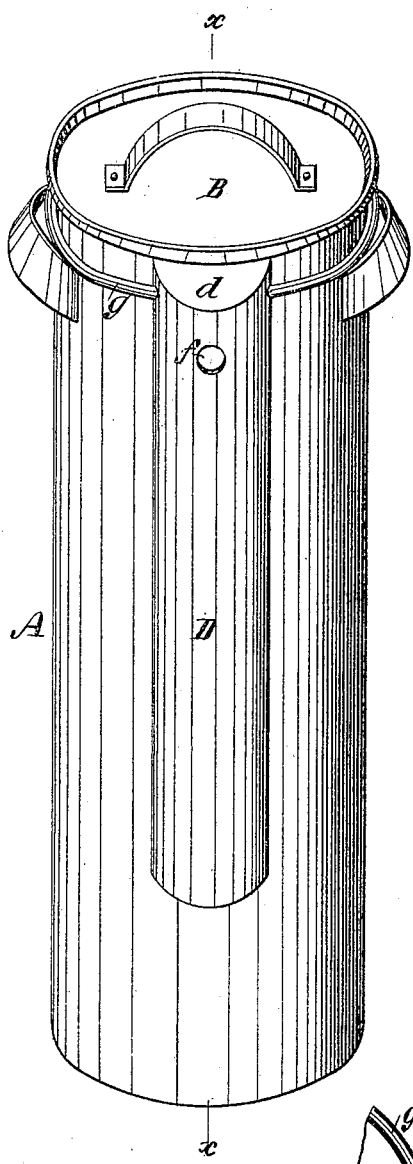
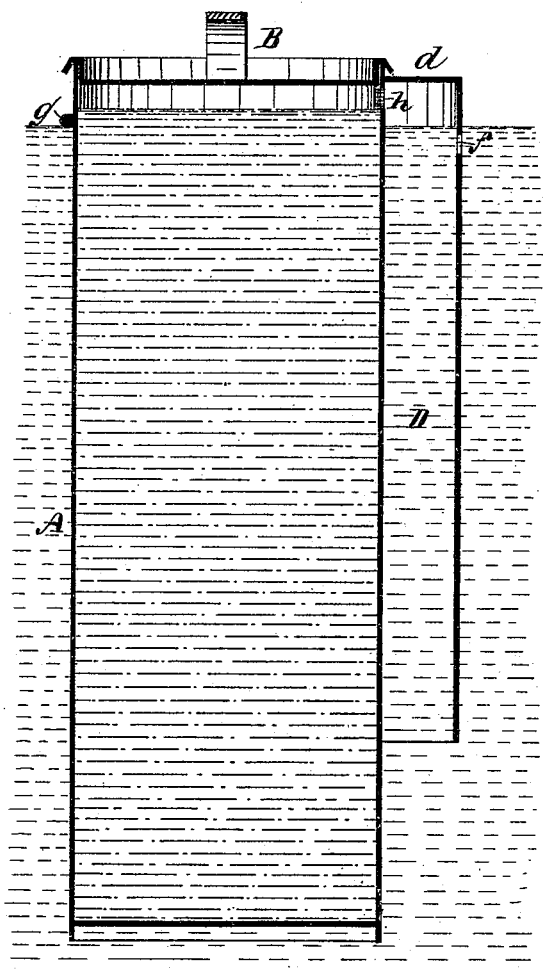
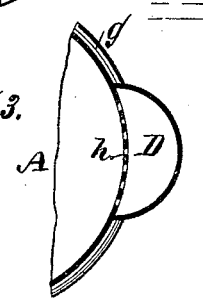
WITNESSES:
Theo. G. Hoster
C. Sedgwick
INVENTOR:
E. F. Smith
BY Munn & Co.
ATTORNEYS.

UNITED STATES PATENT OFFICE.

ELLIS F. SMITH, OF POLO, ILLINOIS.

MILK-COOLER.

SPECIFICATION forming part of Letters Patent No. 252,534, dated January 17, 1882.

Application filed August 27, 1881. (Model.)

*To all whom it may concern:*

Be it known that I, ELLIS F. SMITH, of Polo, Ogle county, Illinois, have invented a new and useful Improvement in Milk-Coolers, of which the following is a specification.

The object of my invention is to provide a milk-cooling and cream-raising can, having such construction that the air can be excluded from contact with the milk, but which will permit the escape of the animal gases and vapors which arise from the milk.

The invention consists in providing the side of the can with a chamber or tube, closed at the top, but open at the bottom, which tube or chamber is provided with an opening a little below the water-line, the can being provided with an opening within the tube or chamber above the water-line.

In the accompanying drawings, Figure 1 is a perspective view of my invention. Fig. 2 is a central longitudinal section of the same, and Fig. 3 is a detailed view, showing in section the said opening in the can.

Similar letters of reference indicate corresponding parts.

In the drawings, A represents the can, which may be of any suitable size or form, and which is provided with the tight fitting cover B. Upon the outside of the can is secured the tube or chamber D, which is open at the bottom, but closed at the top, as shown at $d$. This tube or chamber is formed with the opening $f$ a short distance below the water-line, which line is indicated by the rim or flange or other suitable mark, $g$, around the can. Within this chamber or tube, and a little above the water-line, the body of the can is formed with the foraminous part $h$, through which the gases and vapors which rise from the milk escape into the chamber D, where they become condensed and floated off with the current of water produced in the tube D by the heat of the milk in the can through the opening $f$.

The can is to be suspended in the water by any suitable means, or it can be placed in a vessel and the vessel filled with water up to the water-line of the can, as may be found most convenient.

It will be understood that when the can is submerged in water up to the water-line the opening $f$ will be covered by the water, and thus effectively sealed against all possible admission of air.

By this construction of the can a cheap and effective can is provided which will prevent all deterioration of the cream from contact with the air and contact with the animal and vitiating gases and vapors which are given off while the milk is cooling.

I am aware that milk-coolers provided with flanged covers have heretofore been employed, in which the gases arising from the milk escape from the cooler into the water, either through holes made in the upper end of the cooler or over the edge of the cooler, and, I therefore lay no claim to such invention; but What I do claim, and desire to secure by Letters Patent, is—

1. The can A, formed with the opening $h$, in combination with the chamber D, formed with opening $f$, the opening $h$ being on a higher level than the opening $f$, substantially as and for the purposes set forth.

2. The can A, formed with the water-line mark $g$, and with the opening $h$, in combination with chamber D, formed with the opening $f$, the opening $h$ being above and the opening $f$ below the water-line, as and for the purposes specified.

ELLIS F. SMITH.

Witnesses:
W. A. ST. JOHN,
L. WILSON.